United States Patent [19]
Fukushima

[11] Patent Number: 5,664,960
[45] Date of Patent: Sep. 9, 1997

[54] POWER FEED CONNECTOR

[75] Inventor: Hirotaka Fukushima, Shizuoka, Japan

[73] Assignee: Yazaki Corporation, Tokyo, Japan

[21] Appl. No.: 565,042

[22] Filed: Nov. 30, 1995

[30] Foreign Application Priority Data

Dec. 1, 1994 [JP] Japan ................... 6-298454

[51] Int. Cl.$^6$ ................... H01R 13/62
[52] U.S. Cl. ................... 439/310
[58] Field of Search ................... 439/310, 372, 439/352, 137–142, 341, 376, 474, 484, 483, 476

[56] References Cited

U.S. PATENT DOCUMENTS 5,429,524  7/1995  Wakata et al. ................... 439/310

FOREIGN PATENT DOCUMENTS 63-99787  6/1988  Japan .
6-188044  7/1994  Japan ................... H01R 13/639

Primary Examiner—Gary F. Paumen
Assistant Examiner—Christopher Goins
Attorney, Agent, or Firm—Sughrue, Mion, Zinn, Macpeak & Seas

[57] ABSTRACT

A power feed connector includes an outer casing, a connector body which is slidably mounted within the outer casing, and receives a plurality of terminals, and a handle in the form of a pipe through which wires connected to the plurality of terminals are passed. The handle is pivotally connected to the outer casing at one side of a front end portion thereof (by bearing portions and pin shafts), and is connected in a loosely-fitted manner to a rear end portion of the connector body at the other side of the front end portion thereof (by connecting pins and slots).

8 Claims, 8 Drawing Sheets

POWER FEED CONNECTOR

BACKGROUND OF THE INVENTION

1. Field of the Invention

This invention relates to a power feed connector used, for example, for charging an electric car, and more particularly to a low insertion-force power feed connector which can be quite easily attached to and detached from a power-receiving connector with a small force.

2. Related Art

One conventional power feed connector of the type described is shown in FIG. 8 (Japanese Patent Unexamined Publication No. 6-188044).

In this power feed connector a, as means for moving a connector body c (which receives a plurality of terminals b therein) forward and backward relative to a connector casing d, there are used leverage and a spring e. More specifically, there is provided a mechanism by which when a lever f is grasped, the connector body c is pushed through a handle g, with pins $P_1$ and $P_2$ serving as a fulcrum and an operating point, respectively, and with this construction the power feed connector can be fitted relative to a power-receiving connector with a low insertion force. The rate of reduction of the insertion force at this time is expressed by $(L_1/L_2) \times 100(\%)$ where $L_1$ represents the distance between the fulcrum $P_1$ and the operating point $P_2$, and $L_2$ represents the distance between the fulcrum $P_1$ and a force-applying point $P_3$ of the lever f.

In the above power feed connector a, since the lever f is grasped by one or two hands, it is impossible to obtain a large lever stroke. More specifically, since the distance $L_2$ is actually not so large, it is impossible to obtain a large stroke of the connector body c. Therefore, the size of the connector body and the low insertion-force design are limited, and there has been encountered a problem that this construction can not be put into practical use as a large-size connector for supplying a large electric current.

SUMMARY OF THE INVENTION

The present invention has been made in view of the above problems, and an object of the invention is to provide a power feed connector suited for supplying a large electric current, in which a connector body can be quite easily moved forward and backward with a small force, utilizing leverage.

To achieve the above object, according to the invention, there is provided a power feed connector adapted to be detachably fitted relative to a power-receiving connector mounted on a vehicle body or the like; characterized by the provision of an outer casing; a connector body which is slidably mounted within the outer casing, and receives a plurality of terminals connected respectively to wires; and a handle; wherein the handle is pivotally connected to the outer casing at one side of a front end portion thereof, and is connected in a loosely-fitted manner to a rear end portion of the connector body at the other side of the front end portion thereof.

Preferably, the handle has a tubular configuration, and the wires, connected respectively to the plurality of terminals, are passed through the interior of the handle to the exterior.

According to the present invention, part of a peripheral wall of the outer casing forms a lock chamber, and a lock arm engageable with the power-receiving connector is provided within the lock chamber, and the handle has a lock release lever for the lock arm.

According to the present invention, the handle has a second lock arm mounted on an outer peripheral wall thereof, and the outer casing has a retaining groove in which the second lock arm is engageable when the power feed connector is completely fitted relative to the power-receiving connector.

In the present invention, the connector body is connected directly to the operating point of the handle serving as a lever, and the handle can be formed into a desired length. Therefore, a large propelling force can be obtained with a small force. As a result, a large-size connector, which requires a large insertion force in an ordinary manual operation, can be handled with a small force, and the development and practical use of such a large-size connector are achieved easily.

In the present invention, the handle is of a tubular shape, and the wires, connected to the plurality of terminals, are passed through the interior of the handle to the exterior. Therefore, the wires will not be entangled, and will not be cut during pivotal movement of the handle.

In the present invention, since the lock arm engageable with the power-receiving connector is provided on the outer casing, the power feed connector will not be disengaged from the power-receiving connector before the charging operation is started. And besides, the lock arm can not be unlocked except by the lock release lever, thus ensuring the safe operation.

In the present invention, the handle has the second lock arm mounted on the outer peripheral wall thereof, and the outer casing has the retaining groove in which this second lock arm is engageable. With this construction, the power feed connector is positively prevented from being disengaged from the power-receiving connector during the charging operation.

DETAILED DESCRIPTION OF THE PREFERRED EMBODIMENTS

Figure 1:
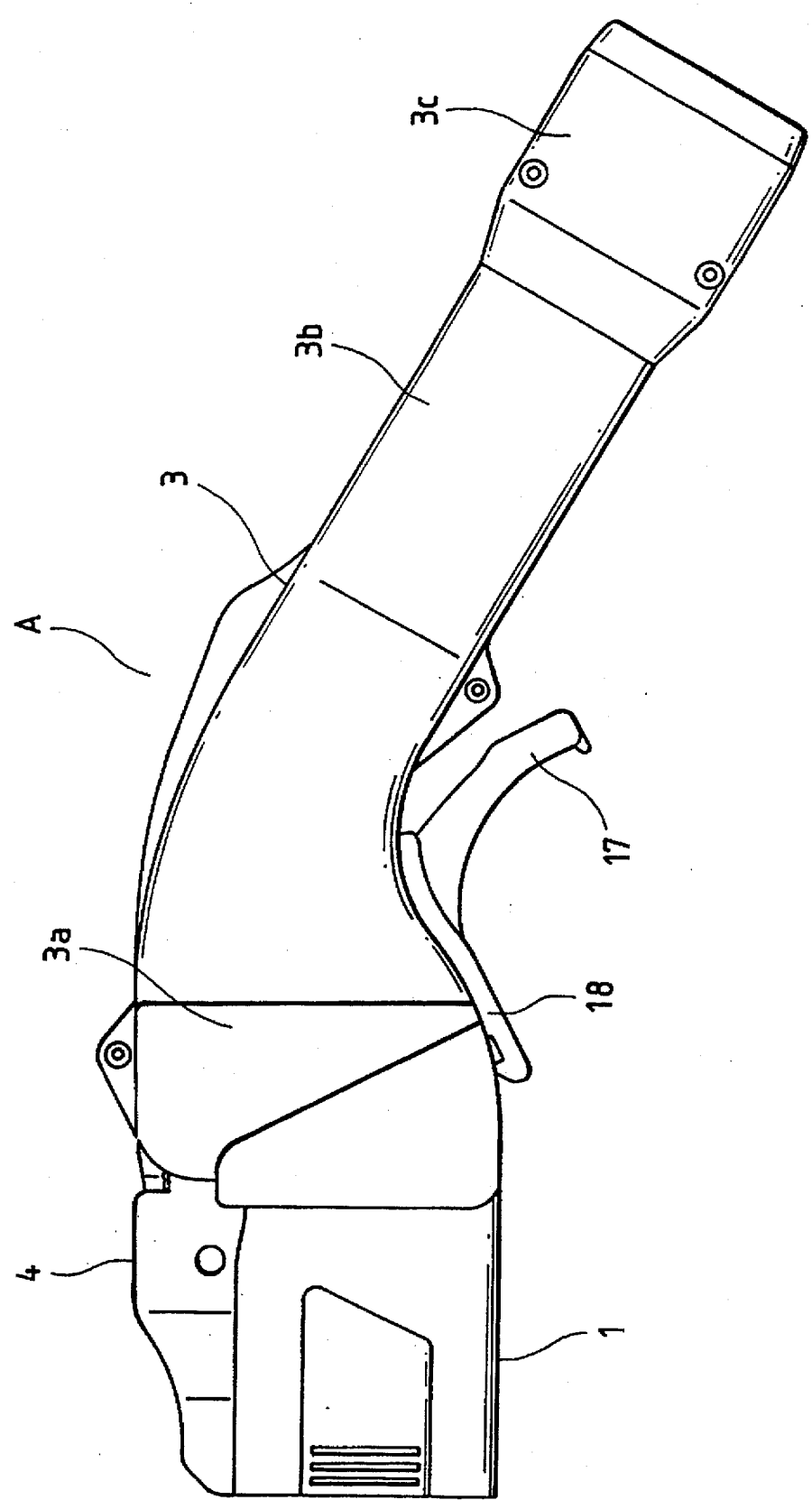
FIG. 1 is a front-elevational view of one preferred embodiment of a power feed connector of the present invention.
Figure 2:
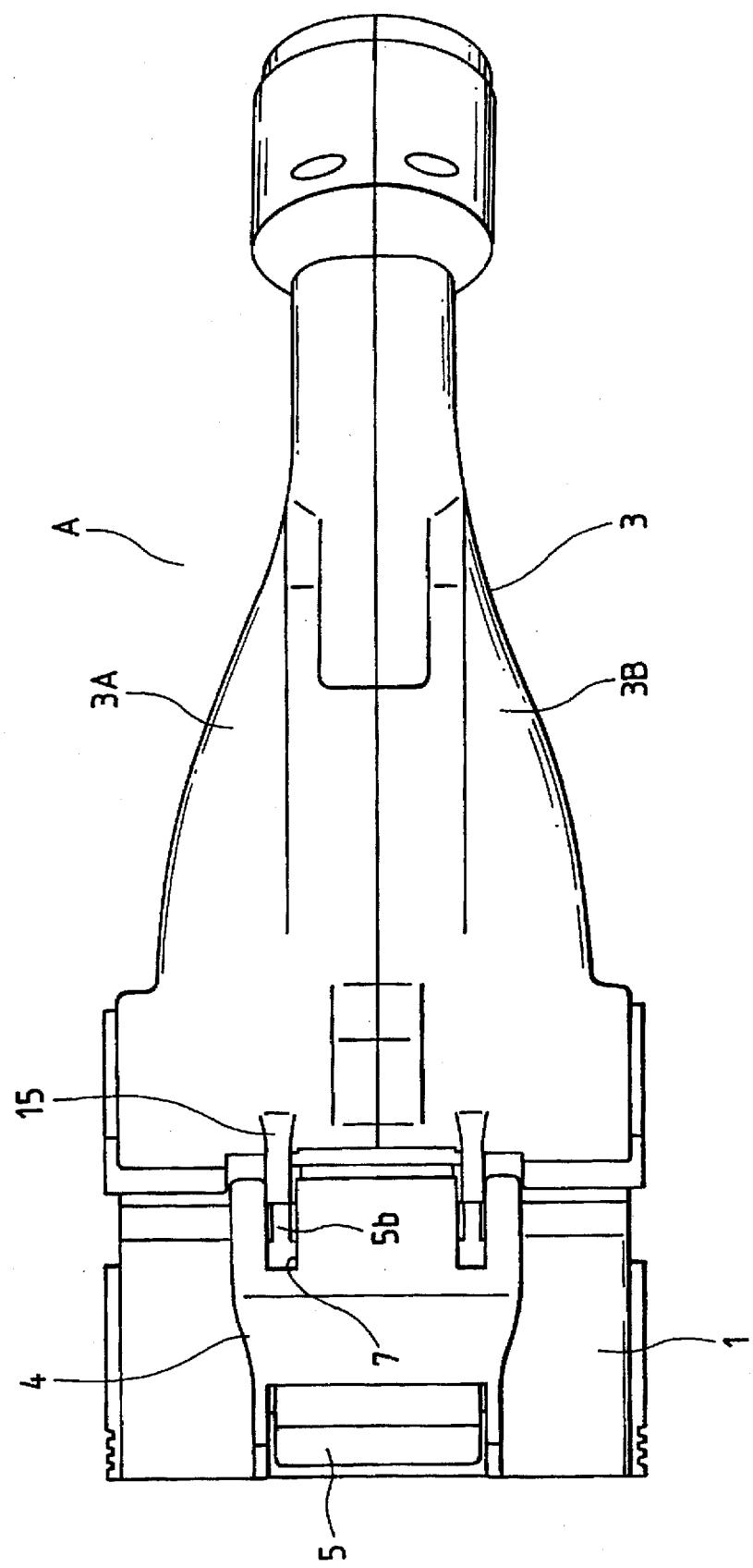
FIG. 2 is a plan view thereof.
Figure 3:
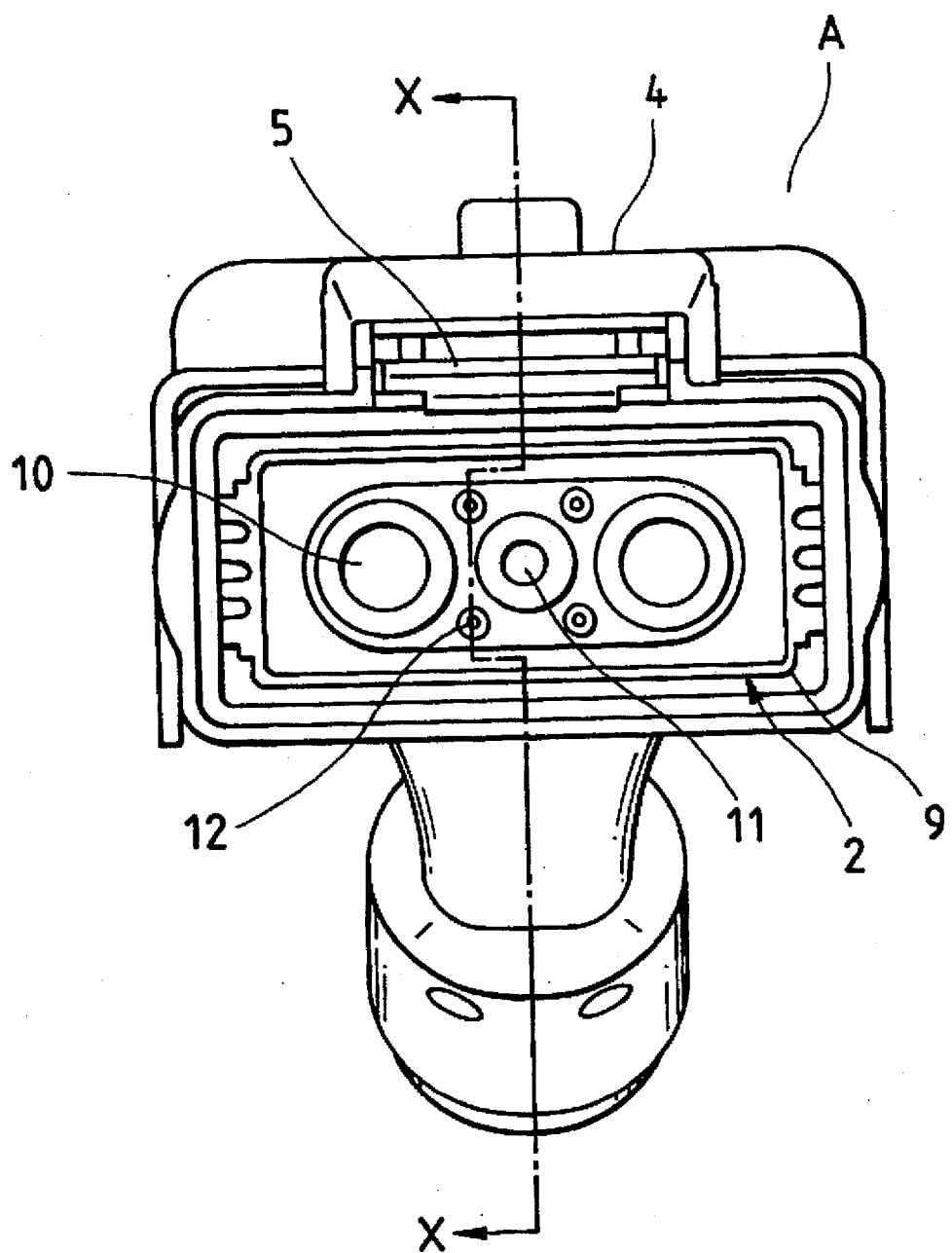
FIG. 3 is a left side-elevational view thereof.
Figure 4:
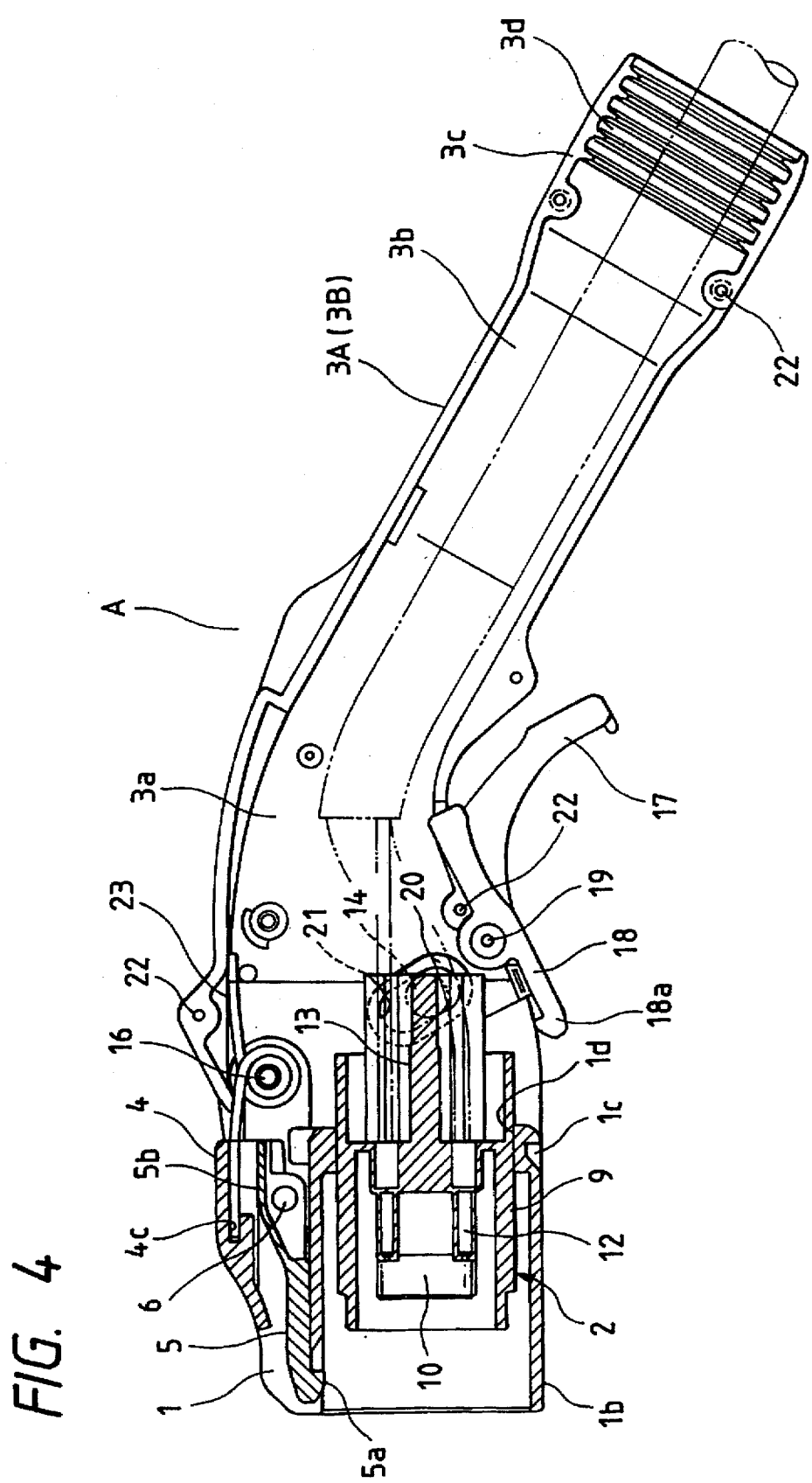
FIG. 4 is a vertical cross-sectional view of the power feed connector taken along the line X—X of FIG. 3.
Figure 5:
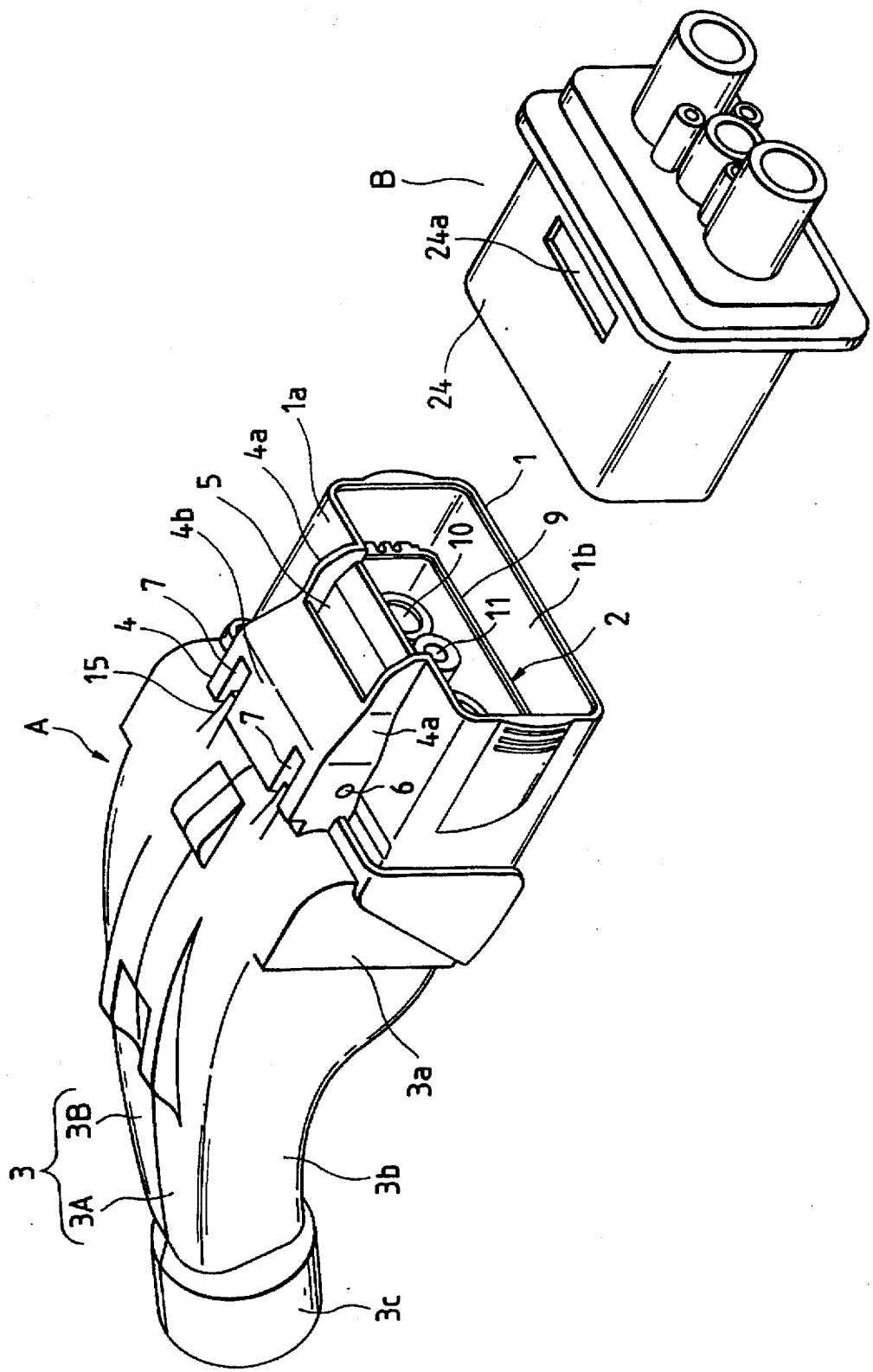
FIG. 5 is a perspective view showing the power feed connector and a power-receiving connector which are separated from each other.
Figure 6:
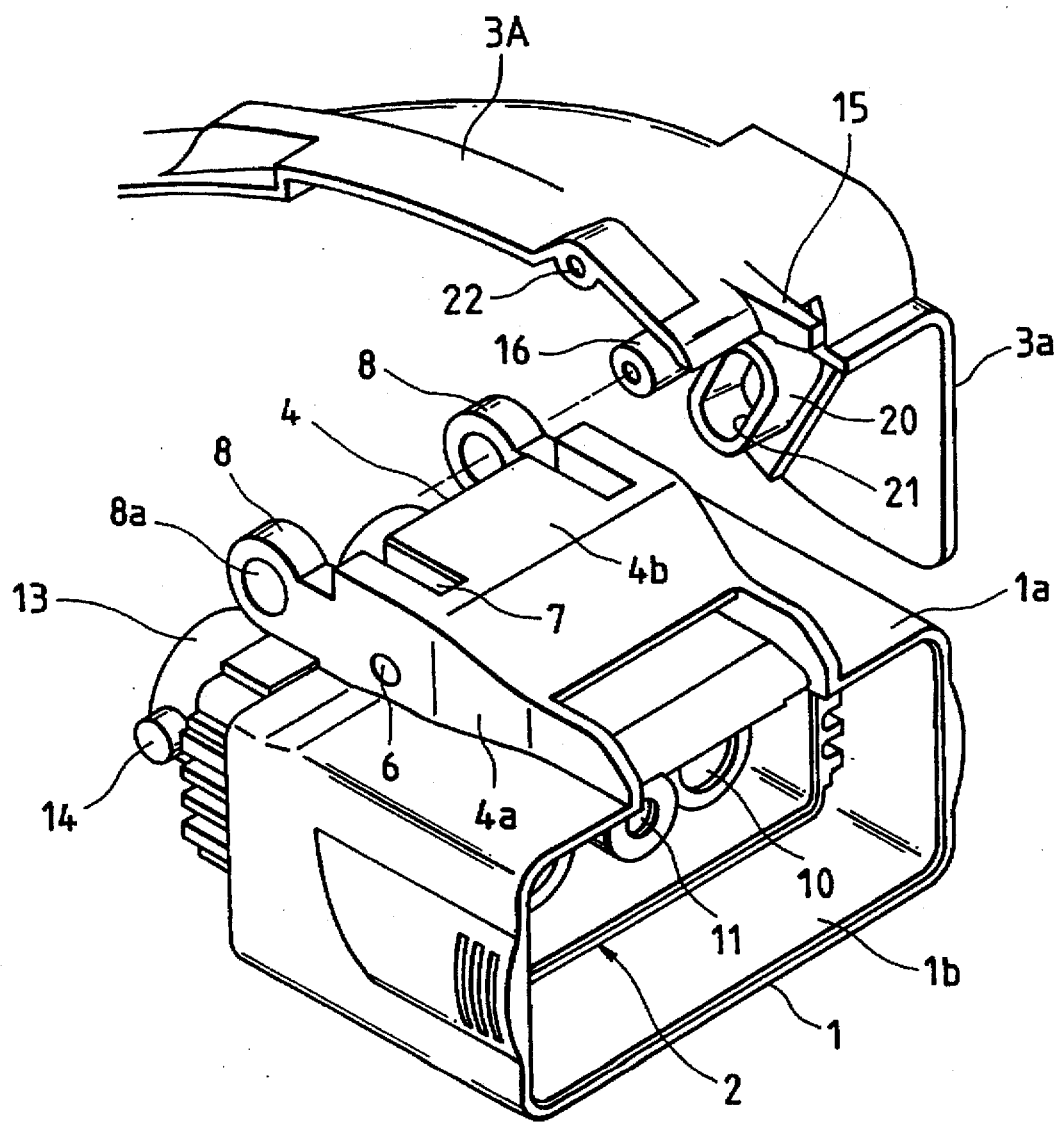
FIG. 6 is a perspective view showing a handle separated from an outer casing of the power feed connector.

FIG. 1 is a front-elevational view of a power feed connector, FIG. 2 is a plan view thereof, FIG. 3 is a left side-elevational view thereof, FIG. 4 is a vertical cross-sectional view of the power feed connector, FIG. 5 is a perspective view showing the power-receiving connector, and FIG. 6 is an exploded, perspective view showing important portions.

As shown in FIG. 5, a charging connector comprises the power feed connector A mounted on a power supply device (not shown), and the power-receiving connector B fixedly mounted on a body of an automobile or the like.

The power feed connector A includes an outer casing 1 of a synthetic resin, and a connector body 2 slidably mounted in the outer casing 1. A handle 3, comprising a pair of half tubes 3A and 3B, is pivotally connected at one side to a rear end of the outer casing 1, and is loosely fitted at the other side in a rear end portion of the connector body 2. A cable C, extending from the power supply device (not shown), passes through the interior of the casing 3, and wires w of the cable C are adapted to be connected respectively to terminals (not shown) mounted within the connector body 2.

The outer casing 1 shown in this embodiment is of a tubular construction having a square cross-section, and has front and rear open ends. A lock chamber 4 is formed on an upper wall 1a of the outer casing 1 in a bulged manner, and a retaining groove 1c is formed in a rear end portion of a lower wall 1b.

The lock chamber 4 has opposite side walls 4a and a top wall 4b, and a relatively wide lock arm 5 is pivotally mounted by a pin 6 within the lock chamber 4. The lock arm 5 has a hook portion 5a formed at its front end, and engagement portions 5b formed respectively on opposite sides of a rear portion thereof. Opposite ends of the pin 6 are fixedly mounted on the opposite side walls 4a and 4a, respectively. A pair of slits 7 are formed through the top wall 4b in facing relation to the engagement portions 5b and 5b of the lock arm 5, respectively. A spring retainer portion 4c is formed at the inner or reverse surface of the top wall 4b, and a pair of bearing portions 8 each having a pivot hole 8a are formed at the rear ends of the opposite side walls 4a, respectively.

A coil spring (not shown) is wound on the pin 6 to urge the hook portion 5a of the lock arm 5 downwardly, that is, toward the connector body 2.

The connector body 2 includes a housing 9 which has three kinds of (that is, large-, medium- and small-size) terminal receiving chambers 10, 11 and 12. The large terminals for power feed lines for charging purposes are retainingly received in the large terminal receiving chambers, respectively, the medium terminal for a grounding line is retainingly received in the medium terminal receiving chamber, and the small terminals for signal lines are retainingly received in the small terminal receiving chambers, respectively. A pair of connecting levers 13 are formed respectively on opposite sides of the rear end of the housing 9, and a pair of connecting pins 14 are formed respectively on opposite sides of a free end of each connecting lever 13.

Figure 8:
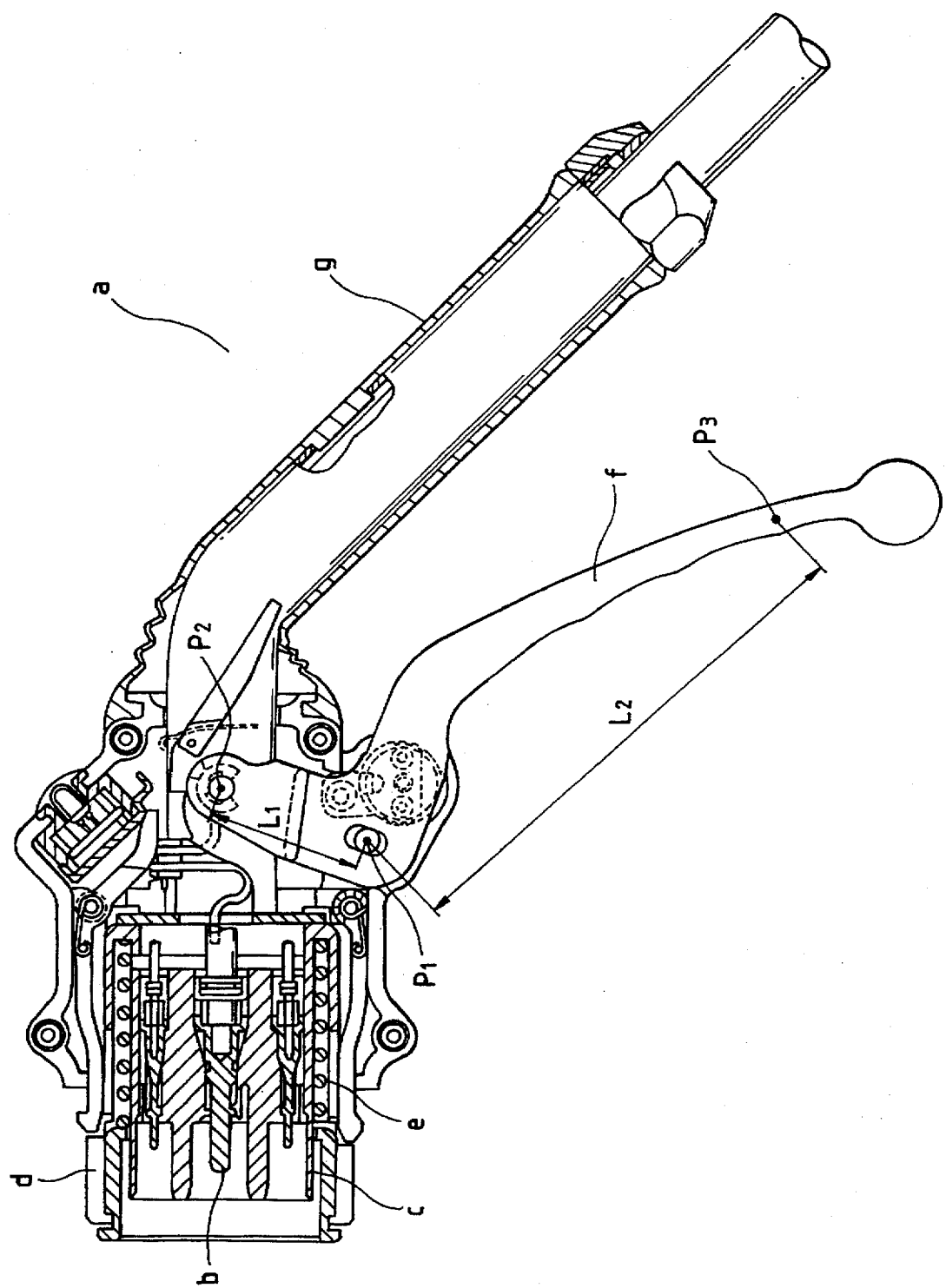
FIG. 8 is a cross-sectional view of a conventional power feed connector.

Male terminals (b) or female terminals as used in the conventional construction of FIG. 8 can be used as the large, medium and small terminals received in the respective terminal receiving chambers 10, 11 and 12, and therefore the showing of these terminals is omitted.

Each of the half tubes 3A and 3B includes a larger-size portion 3a corresponding to the outer casing 1, a tapering grip portion 3b extending from the larger-size portion 3a, and a corrugated tube-connecting portion 3c defining a rear portion of the half tube. Grooves 3d are formed in the inner surface of the corrugated tube-connecting portion 3c, and a corrugated tube (not shown) receiving the cable C therein can be fixedly fitted in the corrugated tube-connecting portions 3c.

As shown in FIG. 6, a lock release lever 15 for insertion into the associated slit 7 is formed at an upper portion of a front end of the larger-size portion 3a of each the half tubes 3A and 3B, and a pin shaft 16 extends from an inner surface of a side wall of the larger-size portion 3a below the lock release lever 15. A second lock arm 18 having a trigger 17 is mounted on lower portions of the front ends of the larger-size portions 3a by a pin 19, and this second lock arm 18 has at its front end a hook portion 18a engageable in the retaining groove 1c. A second bearing portion 20, having a slot 21 open toward the connector body 2, is formed on the inner surface of the side wall of the larger-size portion 3a. The second bearing portion 20 is slanting such that an upper end of the slot 21 is directed toward the connector body 2. Reference numeral 22 denotes a screw insertion hole used for fastening the half tubes 3A and 3B together.

For assembling the power feed connector A, the connector body 2 is slidably fitted in a rear open end 1d of the outer casing 1, and the half tubes 3A and 3B, jointly constituting the handle 3, are mated together to respectively cover opposite sides of the rear end portion of the connector body 2, and are fastened together by screws (not shown), passing respectively through the screw insertion holes, and nuts (not shown). More specifically, the two half tubes 3A and 3B are mated together in such a manner that the pin shafts 16, formed respectively on the half tubes 3A and 3B, are passed respectively through the pivot holes 8a of the bearing members 8 of the lock chamber 4, and that the connecting pins 14 at the rear end of the connector body 2 are loosely fitted respectively in the slots 21 of the second bearing portions 20. Then, in this condition the two half tubes 3A and 3B are fixed together. At this time, a coil spring 23 is wound on the pin shaft 16, and is fixedly held at one end by the spring retainer portion 4c at the inner surface of the top wall 4b, and is abutted at the other end against the top wall of the larger-size portion 3a. With this arrangement, the handle 3 is urged toward the outer casing 1, so that the two are normally held in a closed condition.

Next, the fitting of the power feed connector A relative to the power-receiving connector B, the charging operation, and the disconnection of the connector A from the connector B will now be described.

First, when the power feed connector A is fitted on the power-receiving connector B, a hood 24 of the connector B enters the outer casing 1, so that the two connectors A and B are apparently fitted (provisionally fitted) together, and also the hook portion 5a of the lock arm 5 is engaged in an engagement recess 24a in the hood 24, thereby locking the two connectors together.

Figure 7:
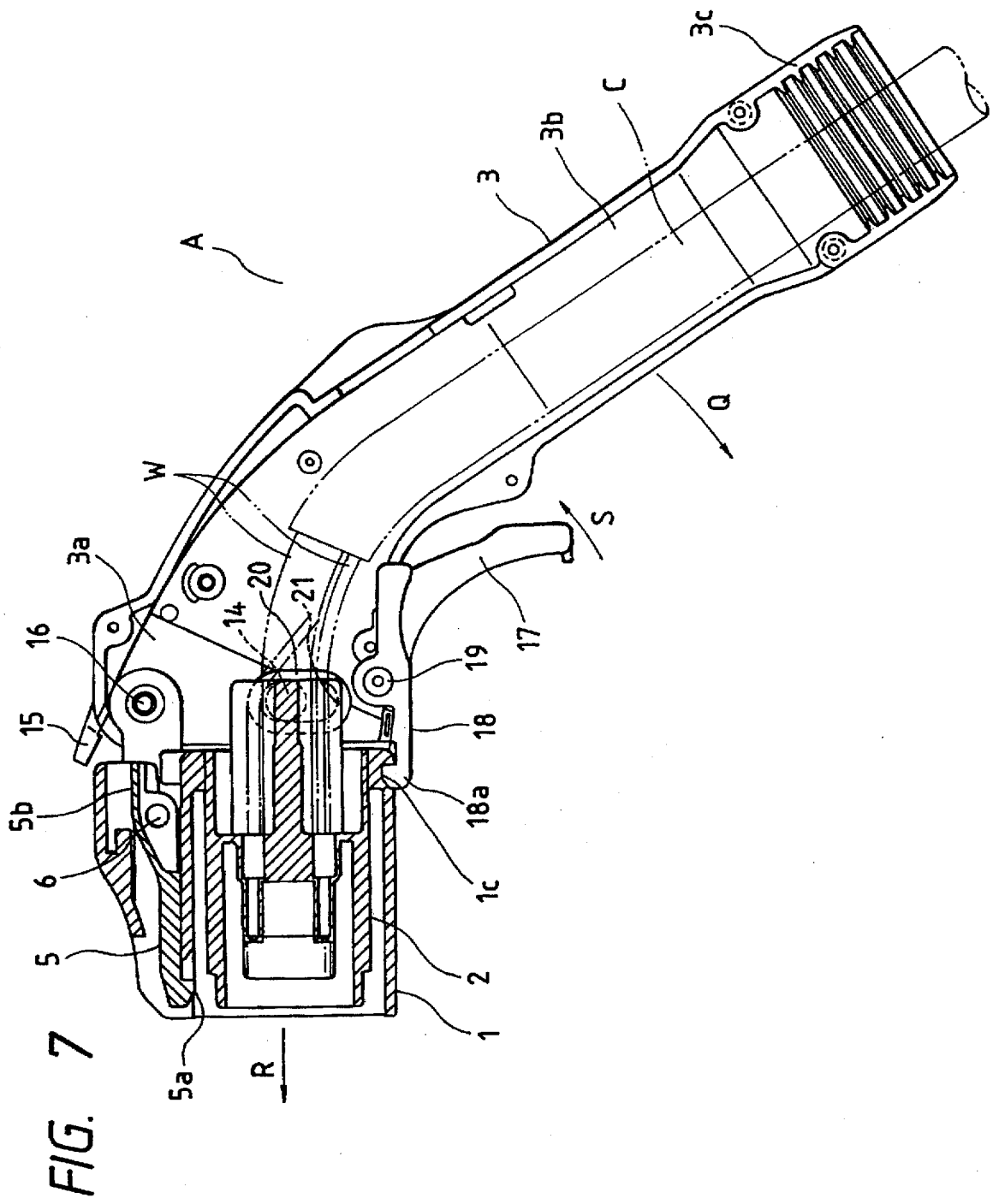
FIG. 7 is a view explanatory of the operation of the power feed connector of FIG. 1.

In this locked condition of the two connectors A and B, when the handle 3 is pivotally moved abut the pin shafts 16 in a direction of arrow Q as shown in FIG. 7, the connector body 2 is forced forward in a direction of arrow R through the connecting pins 14 engaged in the respective slots 21. As a result, the connector body 2 is completely fitted relative to the power-receiving connector B, and the terminals in the terminal receiving chambers 10 to 12 are connected respectively to the associated mating terminals. Simultaneously with this complete fitting, the hook portion 18a of the second lock arm 18 of the handle 3 is engaged in the retaining groove 1c in the outer casing 1, thereby locking the outer casing 1 and the handle 3 together. During the time when the connector body 2 is thus held in the completed-fitted condition, with the lock arm 18 achieving the locking, the charging operation is effected through the two connectors A and B electrically connected together.

After the charging is finished, the trigger 17 is pulled to be turned in a direction of arrow S (FIG. 7), thereby releasing the locking between the outer casing 1 and the handle 3. Then, the handle 3 is pivotally moved in a direction opposite to the direction of arrow Q, so that the connector body 2 is moved backward according to a procedure reverse to the above procedure. Then, the handle 3 is further moved from the position of FIG. 4 in the direction opposite to the direction of arrow Q, so that the lock release levers 15 enter the lock chamber 4 through the respective slits 7, and urge the engagement portions 5b of the lock arm 5 downward, respectively. As a result, the front end portion of the lock arm 5 is pivotally moved upwardly about the pin 6, so that the hook portion 5a is disengaged from the engagement recess 24a in the power-receiving connector B, and the power feed connector A can be moved apart from the power-receiving connector.

A large proportion of each engagement portion 5b of the lock arm 5 is covered with the top wall 4b of the lock chamber 4, and the engagement portion 5b is slightly exposed to the exterior through the slit (narrow opening) 7. Therefore, apart from the lock release levers 15, the lock arm 5 can not be easily contacted from the exterior, and therefore there is no fear that the lock arm 5 is accidentally unlocked.

The connector body 2 is directly connected at the connecting pins 14 to the operating point (slots 21) of the handle 3 serving as a lever, and besides the handle 3 can be formed into a desired length. Therefore, even if the power feed connector A has a large size, it can be connected to and disconnected from the power-receiving connector B with a small force, and the stroke of the connector body 2 can be increased.

The power feed connector of the present invention comprises the outer casing, the connector body which is slidably mounted within the outer casing, and receives the plurality of terminals connected respectively to the wires, and the handle, and the handle is pivotally connected to the outer casing at one side of the front end portion thereof, and is connected in a loosely-fitted manner to the rear end portion of the connector body at the other side of the front end portion thereof. With this construction, the connector body is connected directly to the operating point of the lever (handle), and the handle can have a sufficient length. Therefore, the large propelling force can be obtained, and the two connectors can be connected together and disconnected from each other with a small force, and this construction is suited for a large-size connector for supplying large electric current.

What is claimed is:

1. A power feed connector adapted to be detachably fitted relative to a power-receiving connector mounted on a vehicle body or the like comprising:

an outer casing;

a connector body slidably mounted within said outer casing, and receiving a plurality of terminals connected respectively to wires; and a handle pivotally connected to said outer casing at one side of a front end portion of said handle, and directly connected in a loosely-fitted manner to a rear end portion of said connector body at the other side of the front end portion of said handle, wherein when said handle is pivoted with respect to said outer casing, said handle moves said connector body relative to said outer casing to connect and disconnect said connector body from the power-receiving connector.

2. A power feed connector according to claim 1, wherein said handle has a tubular configuration, and said wires, connected respectively to said plurality of terminals, are passed through the interior of said handle to the exterior.

3. A power feed connector according to claim 1, wherein part of a peripheral wall of said outer casing forms a lock chamber, and a first lock arm engageable with said power-receiving connector is provided within said lock chamber, and said handle has a lock release lever for said lock arm.

4. A power feed connector according to claim 2, wherein part of a peripheral wall of said outer casing forms a lock chamber, and a lock arm engageable with said power-receiving connector is provided within said lock chamber, and said handle has a lock release lever for said lock arm.

5. A power feed connector according to claim 1, wherein said handle has a second lock arm mounted on an outer peripheral wall thereof, and said outer casing has a retaining groove in which said second lock arm is engageable when said power feed connector is completely fitted relative to said power-receiving connector.

6. A power feed connector according to claim 2, wherein said handle has a second lock arm mounted on an outer peripheral wall thereof, and said outer casing has a retaining groove in which said second lock arm is engageable when said power feed connector is completely fitted relative to said power-receiving connector.

7. A power feed connector according to claim 3, wherein said handle has a second lock arm mounted on an outer peripheral wall thereof, and said outer casing has a retaining groove in which said second lock arm is engageable when said power feed connector is completely fitted relative to said power-receiving connector.

8. A power feed connector according to claim 4, wherein said handle has a second lock arm mounted on an outer peripheral wall thereof, and said outer casing has a retaining groove in which said second lock arm is engageable when said power feed connector is completely fitted relative to said power-receiving connector.

* * * * *